US010362427B2

United States Patent
Hu et al.

(10) Patent No.: US 10,362,427 B2
(45) Date of Patent: Jul. 23, 2019

(54) GENERATING METADATA FOR AUDIO OBJECT

(71) Applicant: DOLBY LABORATORIES LICENSING CORPORATION, San Francisco, CA (US)

(72) Inventors: Mingqing Hu, Beijing (CN); Lie Lu, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 113 days.

(21) Appl. No.: 15/508,065

(22) PCT Filed: Aug. 31, 2015

(86) PCT No.: PCT/US2015/047657
§ 371 (c)(1),
(2) Date: Mar. 1, 2017

(87) PCT Pub. No.: WO2016/036637
PCT Pub. Date: Mar. 10, 2016

(65) Prior Publication Data
US 2017/0238117 A1    Aug. 17, 2017

Related U.S. Application Data

(60) Provisional application No. 62/053,617, filed on Sep. 22, 2014.

(30) Foreign Application Priority Data

Sep. 4, 2014    (CN) .......................... 2014 1 0459713

(51) Int. Cl.
*G06F 17/00*    (2019.01)
*H04S 7/00*     (2006.01)
(Continued)

(52) U.S. Cl.
CPC .............. *H04S 7/302* (2013.01); *G01S 5/18* (2013.01); *G10L 19/008* (2013.01); *G11B 27/10* (2013.01);
(Continued)

(58) Field of Classification Search
CPC . H04S 7/302; H04S 7/30; H04S 7/301; H04S 2400/01; H04S 2400/11;
(Continued)

(56) References Cited

U.S. PATENT DOCUMENTS 7,783,495 B2    8/2010  Seo
7,957,538 B2    6/2011  Cho
(Continued)

FOREIGN PATENT DOCUMENTS

CN    101419801    4/2009
CN    103618986    3/2014
(Continued)

OTHER PUBLICATIONS

Oldfield, R. et al "Object-Based Audio for Interactive Football Broadcast" Multimedia Tools and Applications vol. 74, No. 8, May 1, 2013, pp. 2717-2741.
(Continued)

*Primary Examiner* — Md S Elahee
*Assistant Examiner* — David Siegel

(57) ABSTRACT

Example embodiments disclosed herein relate to audio object processing. A method for processing audio content, which includes at least one audio object of a multi-channel format, is disclosed. The method includes generating metadata associated with the audio object, the metadata including at least one of an estimated trajectory of the audio object and an estimated perceptual size of the audio object, the perceptual size being a perceived area of a phantom of the audio
(Continued)

object produced by at least two transducers. Corresponding system and computer program product are also disclosed.

23 Claims, 6 Drawing Sheets

(51) Int. Cl.
*G01S 5/18* (2006.01)
*G10L 19/008* (2013.01)
*G11B 27/10* (2006.01)

(52) U.S. Cl.
CPC ............... *H04S 7/30* (2013.01); *H04S 7/301* (2013.01); *H04S 2400/01* (2013.01); *H04S 2400/11* (2013.01); *H04S 2420/01* (2013.01)

(58) Field of Classification Search
CPC ..... H04S 2420/01; G01S 5/18; G10L 19/008; G11B 27/10
See application file for complete search history.

(56) References Cited

U.S. PATENT DOCUMENTS

| | | | |
|---|---|---|---|
| 8,194,861 B2 | 6/2012 | Henn | |
| 8,213,641 B2 | 7/2012 | Faller | |
| 8,340,306 B2 | 12/2012 | Faller | |
| 8,374,365 B2 | 2/2013 | Goodwin | |
| 8,379,868 B2 | 2/2013 | Goodwin | |
| 2008/0187144 A1 | 8/2008 | Seo | |
| 2008/0232617 A1 | 9/2008 | Goodwin | |
| 2012/0114126 A1 | 5/2012 | Thiergart | |
| 2012/0183162 A1* | 7/2012 | Chabanne | H04N 5/642 381/306 |
| 2013/0182852 A1 | 7/2013 | Thompson | |
| 2013/0259236 A1 | 10/2013 | Chon | |
| 2014/0016786 A1 | 1/2014 | Sen | |

FOREIGN PATENT DOCUMENTS

| | | |
|---|---|---|
| JP | 05033156 | 9/2012 |
| KR | 2009-131237 | 12/2009 |
| KR | 2011-0010193 | 2/2011 |
| WO | 2008/113428 | 9/2008 |
| WO | 2011/129655 | 10/2011 |
| WO | 2014/036121 | 3/2014 |
| WO | 2014/076030 | 5/2014 |

OTHER PUBLICATIONS

Kwon, B. et al "Multiple Sound Sources Localization Using the Spatially Mapped GCC Functions" ICROS-SICE International Joint Conference, Aug. 18-21, 2009, Fukuoka International Congress Center, Japan, pp. 1-4.

* cited by examiner

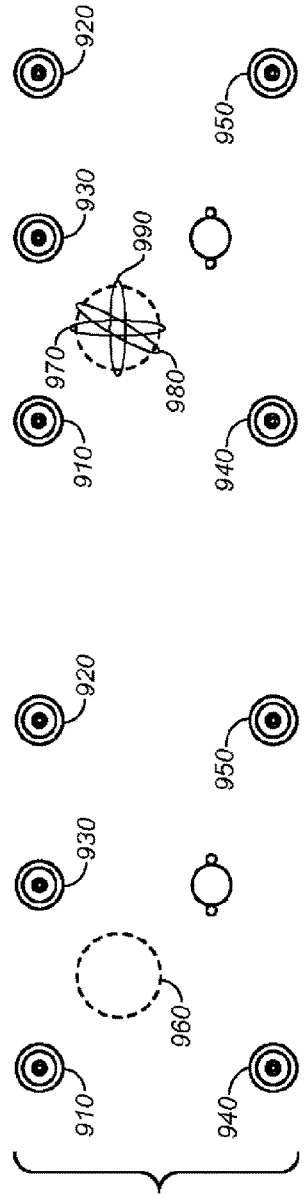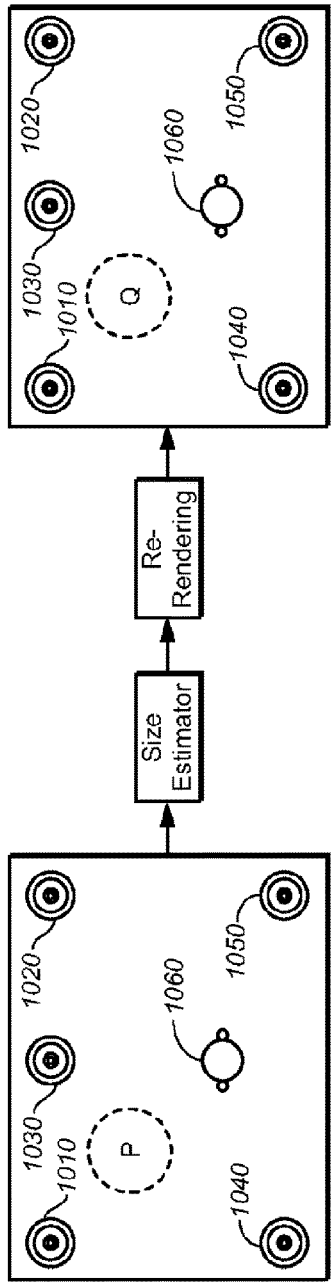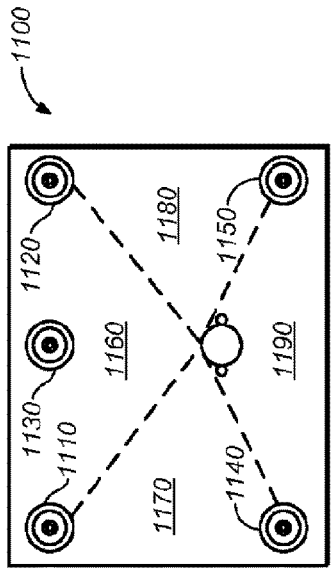
FIG. 9
FIG. 10
FIG. 11

GENERATING METADATA FOR AUDIO OBJECT

CROSS-REFERENCE TO RELATED APPLICATIONS

This application claims priority to Chinese Patent Application No. 201410459713.4 filed 4 Sep. 2014 and U.S. Provisional Patent Application No. 62/053,617 filed 22 Sep. 2014, which are both hereby incorporated by reference in their entirety.

TECHNOLOGY

Example embodiments disclosed herein generally relate to audio content processing and more specifically, to a method and system for processing an audio object of a multi-channel format.

BACKGROUND

Traditionally, audio content is created and stored in channel-based formats. As used herein, the term "audio channel" or "channel" refers to the audio content that usually has a predefined physical location. For example, stereo, surround 5.1, 7.1 and the like are all channel-based formats for the audio content. Recently, with developments in the multimedia industry, three-dimensional (3D) movies and television content are getting more and more popular in cinema and home. In order to create more immersive sound fields and to control discrete audio elements accurately (irrespective of specific playback speaker configurations) many conventional multichannel systems have been extended to support a new format that includes both channels and audio objects.

As used herein, the term "audio object" refers to an individual audio element that exists for a defined duration in time in the sound field. An audio object may be dynamic or static. For example, audio objects may be dialogue, gunshots, thunder, etc. As an important element, audio objects are usually used by mixers to create their desired sound effects.

Conventionally, an audio content or audio signal based on multi-channel format includes separate signals for at least two channels. For example, there can be five different signals included in a surround 5.1 speaker system. Each of the separated audio signals is used for driving its corresponding speaker positioned in a stage defined by each and every physical speaker. Since energy allocated to each channel for a single audio object is distinct, the speakers or transducers may be driven differently and reproduce a same audio object in different loudness, which results in a particular position perceived by a listener in the stage. In addition, the audio signal based on multi-channel format may itself include an inter-channel correlation coefficient (ICC) represented, for example, in the form of differences on phase and amplitude among channels. The information on the energy allocation and the ICC of a particular audio object may allow the plurality of speakers representing the audio object with its position and size being able to be perceived by the listener.

Presently, a particular audio signal in multi-channel format adapted for a certain multi-channel surround system needs to be rendered by professionals. That is, rendered in a studio using panning tools and properties (e.g., such as positions and sizes of different audio objects) which can only be tailored in the studio for a specific format (e.g., a fixed number of channels corresponding to a fixed playback setting). As such, the properties cannot be manipulated once they have been created. As a result, if one would like to play well rendered audio content in 5.1 format on a 7.1 speaker system or an ordinary stereo system, interpretation by such a playback system is not optimized. Also, properties, such as positions and sizes of the audio objects may not be played precisely by the speakers. In other words, when the audio content is created with a multi-channel format, the listening experience perceived by listeners is optimized by mixers for a specific playback setting. When the audio content is played by a distinct playback setting, the performance may degrade due to a mismatch between playback settings, such as a position change of an audio object.

In view of the foregoing, there is a need in the art for a solution for generating metadata containing the properties of an audio object.

SUMMARY

In order to address the foregoing and other potential problems, the example embodiments disclosed herein proposes a method and system for generating metadata associated with audio objects.

In one aspect, example embodiments disclosed herein provide a method for processing audio content, the audio content including at least one audio object of a multi-channel format. The method includes generating the metadata associated with the audio object, the metadata including at least one of an estimated trajectory of the audio object and an estimated perceptual size of the audio object. The perceptual size being a perceived area of a phantom of the audio object produced by at least two transducers. Embodiments in this regard further include a corresponding computer program product.

In another aspect, example embodiments disclosed herein provide a system for processing audio content, the audio content including at least one audio object of a multi-channel format. The system include a metadata generating unit configured to generate the metadata associated with the audio object, the metadata generating unit including at least one of a trajectory metadata generating unit configured to generate an estimated trajectory of the audio object and a size metadata generating unit configured to generate an estimated perceptual size of the audio object, the perceptual size being a perceived area of a phantom of the audio object produced by at least two transducers.

Through the following description, it would be appreciated that in accordance with embodiments of the present invention, the audio objects can be processed to be assigned metadata including the trajectory and the perceptual size information. The converted new audio objects in the audio content are advantageous, because such audio content can be precisely played in any playback system, regardless of the number of dimensions as well as the number of transducers. In addition, the metadata is easily manipulated and improved in post-processing stages, and as a result, representation of the audio content in almost every acoustic system (even a headphone) can be adapted to be accurate, and thus immersive. Other advantages achieved by the example embodiments will become apparent through the following descriptions.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments will be illustrated in an example and in a non-limiting manner, wherein:

FIG. 9 illustrates an example of aggregating the generated perceptual size from each pair out of three speakers in accordance with an example embodiment;

FIG. 10 illustrates a calibration experiment for obtaining a more accurate perceptual size in accordance with an example embodiment;

FIG. 11 illustrates a possible strategy to divide the space constructed by the speakers L, R, Ls and Rs into several sub-spaces in accordance with an example embodiment;

Throughout the drawings, the same or corresponding reference symbols refer to the same or corresponding parts.

DESCRIPTION OF EXAMPLE EMBODIMENTS

Figure 1:
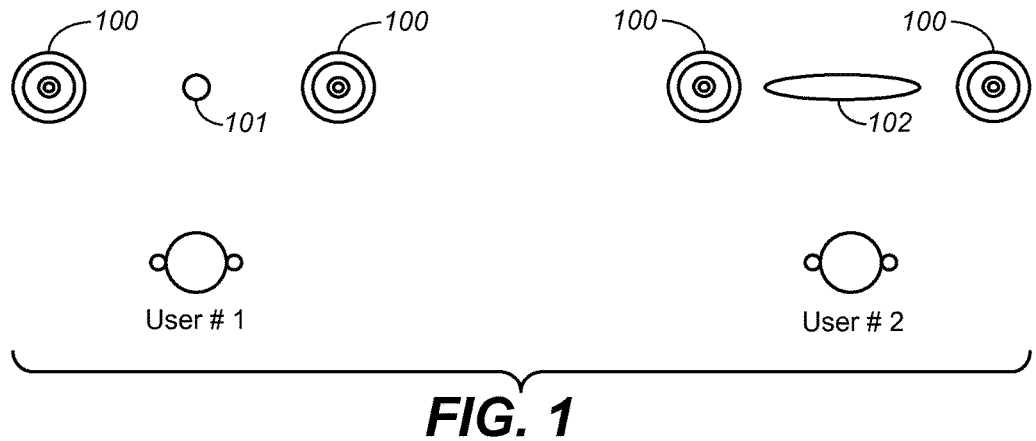
FIG. 1 illustrates a perceptual phantom for an audio object with different ICC values extraction in accordance with an example embodiment.

Principles of the present invention will now be described with reference to various example embodiments illustrated in the drawings. It should be appreciated that the depiction of these embodiments is to enable those skilled in the art to better understand and further implement the example embodiments, not intended for limiting the scope in any manner.

The example embodiments assume that the audio content as input is in a multi-channel format, such non-limiting examples may include 5.1, 7.1 or 7.1.4 (where the number 4 means four overhead speakers). A number of audio objects can be easily processed by repeating the method as claimed by the example embodiments. It should be noted that, in the example embodiments, extraction of the audio object will not be mentioned, and all the audio objects fulfilling the requirements listed below among others may be regarded as a usable audio object:

An audio object either from off-the-shelf content, where a clean object is already available, or automatically extracted from an audio content where the desirable audio object is typically mixed with others by using various audio extraction techniques;

An audio object represented in either full-band or subband, where a full-band indicates all spectral information with regard to the audio object, along with the spectral direction, is included, while a sub-band indicates only a part of the spectral information of the audio object is available; and An audio object incomplete over time which may result from, for example, an imperfect temporal segmentation in the automatic audio object extraction process.

As mentioned above, the metadata associated with an audio object, in the present invention, mainly concentrates on the trajectory and the perceptual size of the audio object. The perceptual size herein refers to an area of an enlarged phantom compared with a pinpoint phantom of the audio object produced by at least two physical transducers or speakers in a sound field.

The position of an audio object can be either in a two-dimensional (2D) plane or in a three-dimensional (3D) space. For example, for a 5.1 or a 7.1 channel configuration, the positions are generally in a 2D plane (x, y), while for a 7.1.4 configuration, the positions are in a 3D space (x, y, z). In some cases, such as audio up-mixing, a conversion of the positions from 2D (x, y) to 3D (x, y, z) is expected, as the 3D space provides a new dimension of immersive experience.

The perceptual size of an audio object is defined by an area of a produced audio playback perceived by listeners. For example, when both a front left speaker and a front right speaker are playing a same audio object with similar energy levels, they will represent a phantom object between these two physical speakers, and the listener will perceive that the object is from front center as a pinpoint phantom 101, as shown in the left side of FIG. 1.

In FIG. 1, for each user (user #1 and user #2), there are two speakers 100 that play the same audio object, which means that the inter-channel correlation coefficient (ICC) is exact one. The perceptual size of an audio object, as illustrated by an encircled area between the two speakers 100, is dependent on the ICC value, which is verified by extensive listening experiments. By decreasing the ICC value from one to zero, the perceptual size will increase from zero to one accordingly. For example, if an audio object of monochannel format is duplicated to both speakers 100 and played simultaneously without phase difference, the audio object being played can be regarded as the pinpoint phantom as described above with the ICC value equal to one. If some operations, e.g., de-correlation, are applied, which makes the ICC value smaller than one, a listener would perceive that the audio object being played no longer form a single point but an enlarged phantom image 102, as shown in the right side of FIG. 1. The perceptual size of an audio object is intentionally manipulated by mixers for artistic purposes. As a result, some audio objects are no longer perceived as a pinpoint phantom in practice.

In order to generate the metadata including properties such as the trajectory and the perceptual size, example embodiments proposes a method and system for processing the audio content. The audio content includes at least one audio object of a multi-channel format. Embodiments will be given separately for estimating the trajectory of and the perceptual size of the audio object in the following.

Trajectory Estimation

Figure 2:
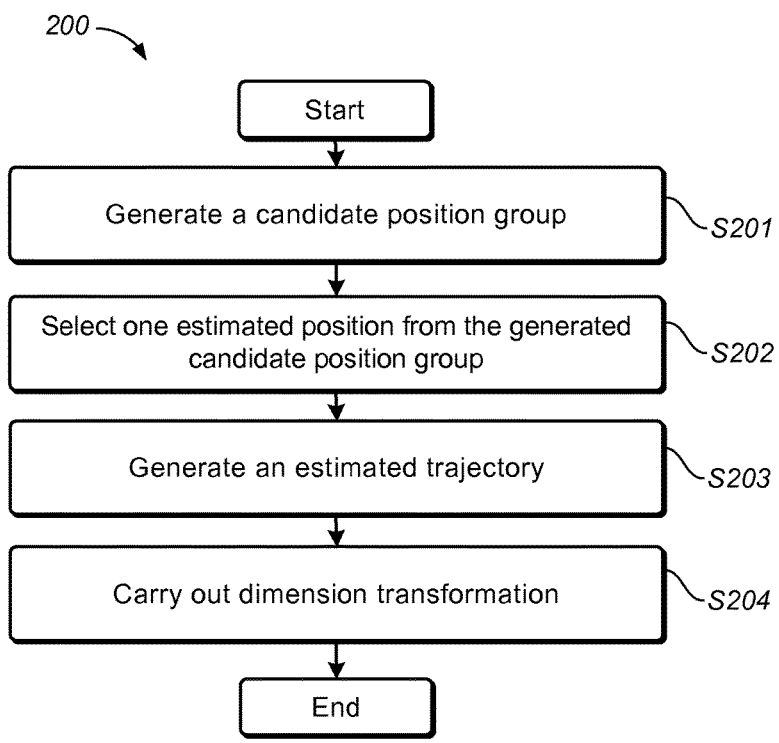
FIG. 2 illustrates a flowchart of a method for processing an audio object in order to estimate the position thereof in accordance with an example embodiment.

Reference is first made to FIG. 2 which shows a flowchart of a method 200 for processing an audio object in order to estimate the position thereof in accordance with exemplary embodiments of the present invention.

The input audio content is of a format based on a plurality of channels. For example, the input audio content may conform to surround 5.1, surround 7.1, even 7.1.4 or the like. The input audio content normally contains at least one audio object having a plurality of frames. At step S201, a position estimation process is applied, which takes the audio object of multi-channel format as input. After step S201, a candidate position group is generated containing at least one candidate position for each of the plurality of frames of the audio object. At step S202, one estimated position is selected from the generated candidate position group for each of the plurality of frames of the audio object. Then, at step S203, an estimated trajectory is generated by using the estimated positions across the plurality of frames of the audio object. Step S204 is optional, where a 2D-to-3D transformation and a 3D-to-2D transformation are both able to be carried out when necessary. In other words, the output estimated trajectory is in the format of either (x, y) or (x, y, z) for each of the plurality of frames of the audio object.

By way of example, there can be three approaches for generating the candidate position group at the step S201, which includes:

Energy-weighted approach, being a simple and straightforward calculation of the position, where a robust estimation is required while accuracy is on the other hand compromised;

Correspondence approach, assuming the availability of the prior knowledge of the panning tool(s) used by the mixer for generating the multi-channel representations of an audio object, where an accurate estimation can be achieved while in some cases robustness is compromised; and Hybrid approach, combining the energy-weighted approach together with the correspondence approach for obtaining both robustness and accuracy of the estimation.

In one embodiment of the present disclosure, the energy-weighted approach is utilized to estimate a position by utilizing a panning coefficient for each of the plurality of channels and a fixed position value for a specific surround system. For example, the fixed position value is a relative position, which may be obtained or estimated by physical positions for each of the plurality of channels. Energy of particular channel for each of the plurality of frames may be denoted as $E_c^f$, and the fixed position value of each of the plurality of channels may be denoted as $p_c^f$, where c and f represent indexes of channels and frames, respectively. For a particular channel, $p_c^f$ is a fixed value for certain surround formats, like a 5.1 or 7.1 system for example. The position estimation process includes first calculating an energy value for each channel $E_c^f$. Then, a panning coefficient $e_c^f$ generated for each of the plurality of channels may be calculated by Equation (1) as below:

$$e_c^f = \frac{E_c^f}{\sum_{c=1}^{N} E_c^f} \quad (1)$$

where N represents the number of channels (for example, N is set to 5 for a surround 5.1 input signal), and $e_c^f$ is a normalized value ranging, for example, from 0 to 1.

After the panning coefficients for all the channels have been calculated for a particular frame, an estimated position may be calculated by Equation (2) as below:

$$p^f = \sum_{c=1}^{N} e_c^f \times P_c^f \quad (2)$$

where $p^f$ represents the estimated position for a particular frame.

In one embodiment, the estimated position can be in a 2D plane, i.e., $p^f=[x^f, y^f]$. Alternatively, in another embodiment, the estimated position can be in a 3D space, i.e., $p^f=[x^f, y^f, z^f]$, depending on the input signal format. In can be observed that the energy-weighted approach outputs coarse estimation of the position value frame by frame, because of the fixed values of $p_c^f$. This approach outputs a single value for each frame, which can be used as the reference value for the correspondence approach as well as the hybrid approach which would be described in the following.

In another embodiment of the present disclosure, the correspondence approach is utilized, which takes a panning tool into account, to result in a more accurate estimation of positions. A panning tool is used for generating a predefined correspondence between a plurality of panning vectors and a plurality of positions. By taking as input the audio object of mono-channel format and its positions over a series of frames, the panning tool may generates a surrounding representation of multi-channel format of the audio object in accordance with its own panning law. The energy of a mono object for the f-th frame may be denoted as $E^f$ and its position may be denoted as $p^f$.

Similar to the calculation for the energy-weighted approach, the energy for each channel may be calculated by Equation (3) as below:

$$E_c^f = \beta_c^f \times E^f, \sum_{c=1}^{N} \beta_c^f = 1 \quad (3)$$

where $E^f$ represents the total energy distributed to N channels, $\beta_c^f$ represents the panning vector which is determined by the position $p^f$ by the panning tool for a specific playback configuration.

The panning coefficient $\beta_c^f$ has similar physical meaning with the panning coefficient $e_c^f$, but the former is known to the mixer and the latter is to be determined for generating the metadata from the audio object of multi-channel format. For each position $p^f$, the panning tool generates an N-dimensional panning vector $\beta^f$, whose entries are $\beta_c^f$, c=1, ..., N, with its sum equaling to one.

In practice, the panning tool typically works directly on an audio object by multiplying a gain factor $\alpha_c^f$, whose value can be obtained as:

$$\alpha_c^f = \sqrt{\beta_c^f} \quad (4)$$

where the gain vector $\alpha^f$ is composed of $\alpha_c^f$, c=1, ..., N.

The gain vector $\alpha^f$ is an alternative expression of the panning vector $\beta^f$.

Figure 3:
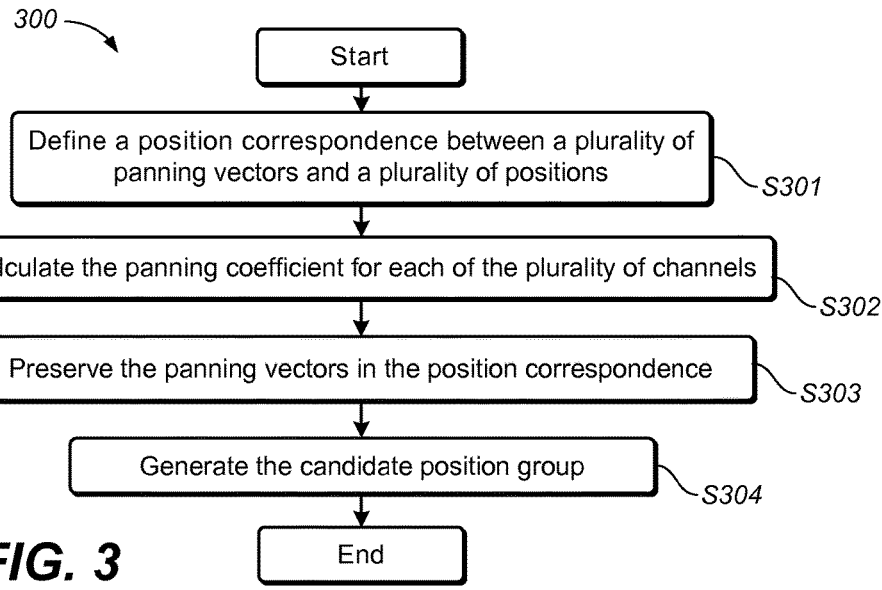
FIG. 3 illustrates a flowchart of a method for processing a position estimation based on a correspondence approach in accordance with another example embodiment.

Reference is made to FIG. 3 which shows a flowchart of a method 200 for the candidate position group generation process based on the correspondence approach.

In order to estimate the positions of an audio object, the correspondence approach needs to predefine a position correspondence. In one embodiment, the position correspondence may be in a form of look-up table. For example, the look-up table may store mappings between a plurality of panning vectors $\beta$ (or gain vectors $\alpha$) and a plurality of positions p. Alternatively, in another embodiment, the position correspondence may be in a form of a function obtained by curve-fitting techniques. In the position correspondence, $\beta$ ($\alpha$) and p are no longer associated with a specific frame. Assuming that the knowledge of the panning tool used by the mixer is available, it is straightforward to form the position correspondence by enumerating all the interested positions p in a grid manner and collecting the corresponding panning vectors $\beta$ (or gain vectors $\alpha$). The position correspondence is typically fixed for a specific panning tool, and may be applicable to each entry of panning vectors ranged from 0 to 1, which corresponds to position values of either 2D or 3D format. In the context, the panning coefficient refers to the percentage of energy for one particular channel over the plurality of channels, while the panning vector refers to a set of the panning coefficient for the plurality of channels. In view of the above, at step S301, a position correspondence between a plurality of panning vectors (or gain vectors) and a plurality of positions is defined.

After the position correspondence is defined, a panning vector can be calculated by using Equation (1) at step S302. Then, at step S303, several panning vectors included in the position correspondences at the step S301 are preserved, with differences between the preserved panning vector and the calculated panning vector at the step S302 being within a predefined value.

Then, at step S304, after the panning vectors for the plurality of channels are preserved, the candidate position group for each of the plurality of frames mapped from the preserved panning vectors is generated, which is denoted as $C^f$. It is observed that there are always a number of candidate positions that are output by using the correspondence approach. For example, the above embodiment demonstrates that 6 candidate positions may be generated after step S303. The candidate positions constitute the candidate position group. This approach is an inverse process of the panning tool used by the mixer, and thus it achieves a more accurate estimation than the energy-weighted approach does.

In the correspondence approach the candidate position group may contain a number of positions, because the generated panning vector cannot be equal to a value of an exact position in the position correspondence. In this regard, a predefined tolerance as described above is desired for generating a number of candidate positions.

In yet another embodiment of the present disclosure, the hybrid approach is utilized, as a sophisticated method, to combine the advantages of robustness and accuracy. The hybrid approach assumes an in-house panning tool is at hand, and thus it does not require knowledge of the panning tool used by the mixer. Although the in-house panning tool is different from what is actually used by the mixer, the properties of different panning tools are similar. In addition, the generated candidate position group would be filled with extra values when the candidate position group is empty, which improves the robustness.

Figure 4:
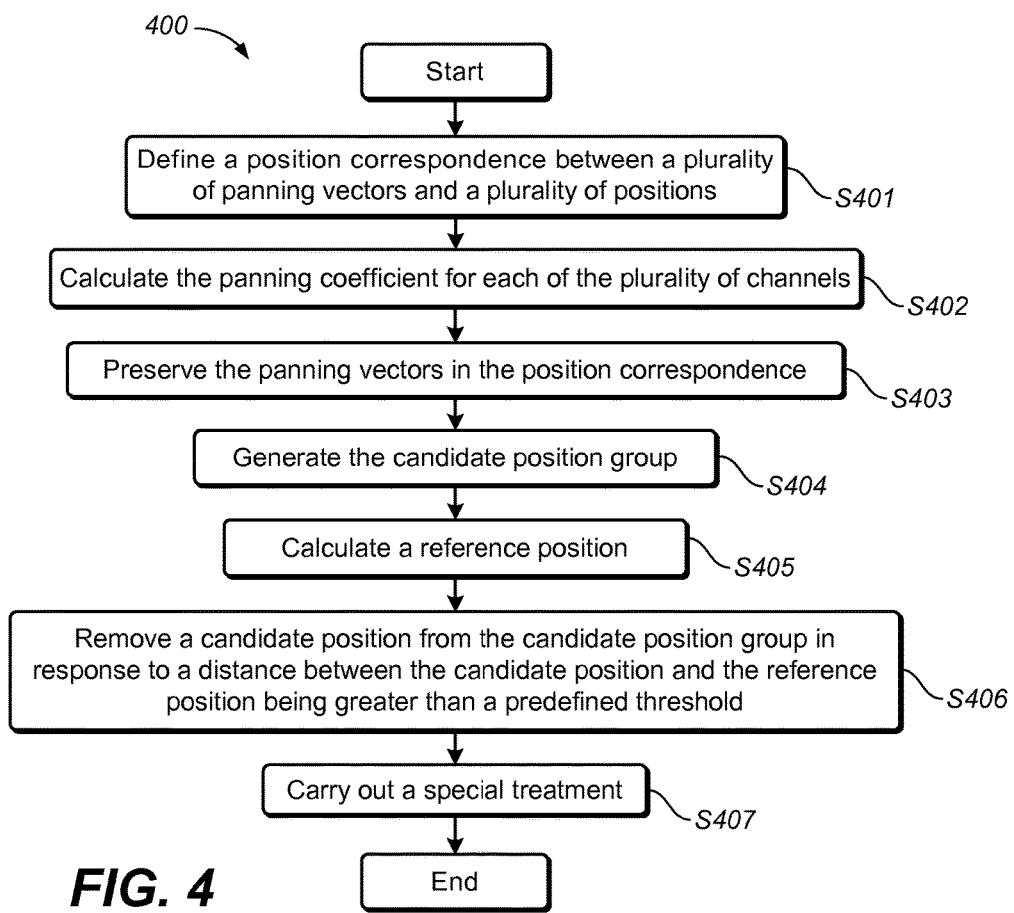
FIG. 4 illustrates a flowchart of a method for processing a position estimation based on a hybrid approach in accordance with another example embodiment.

Reference is made to FIG. 4 which shows a flowchart of a method 400 for the position estimation process based on the hybrid approach.

Similar to the correspondence approach, the hybrid approach also needs the use of a position correspondence. Thus, like what has been described above for the correspondence approach, at step S401, a position correspondence between a plurality of panning vectors (or gain vectors) and a plurality of positions is defined. Because the position correspondence can be defined in a way similar to that of step S301, a detailed description will not be repeated.

After the position correspondence is defined, a panning vector can be calculated by using Equation (1) at step S402. Afterwards, at step S403, several panning vectors included in the position correspondence at the step S401 are preserved, with differences between the preserved panning vectors and the calculated panning vector at the step S402 being within a predefined value. Then, at step S404, after the vector values for the plurality of channels are preserved, the candidate position group for each of the plurality of frames mapped from the preserved panning vectors is generated, which is denoted as $C^f$. Steps S402 to S404 are similar to steps S302 to S304 and therefore will not be repeated herein.

At step S405, a reference position of the audio object for each of the plurality of frames can be calculated based on the panning vector and a predefined position for each of the plurality of channels. The reference position may be the single estimated position for each of the plurality of frames as calculated by Equation (2) and therefore will not be repeated.

Now, there have been obtained a single reference position by the steps as described in the energy-weighted approach, as well as a candidate position group containing a number of estimated positions by the steps as described in the correspondence approach. At step S406, each candidate position in the candidate position group is compared with the reference position, and a candidate position may be removed from the candidate position group in response to a distance between the candidate position and the reference position being greater than a predefined threshold. In other words, if an estimated position is far enough from the reference position, it is highly possible to be an abnormal estimation which should be removed from the candidate position group. Although the reference position generated by the energy-weighted approach is a coarse estimation, the actual position of certain audio object for that particular frame should be geometrically around the reference position. Therefore, step S406 may be used to remove those abnormal candidate positions from the candidate position group.

If all of the candidate positions are abnormal and have been removed at step S306, meaning that now the candidate position group is empty, a special treatment can be carried out at step S407 which may take several actions for outputting positions straightforward without using candidate position group or refilling the candidate position group. In one embodiment, a plurality of predefined positions for the frame can be outputted as the positions. In other words, predefined positions for each of a plurality of physical channels can be used as target positions. In another embodiment, one or more positions can be added into the candidate position group, with distances between the added positions and the reference position being below a predefined threshold. In other words, a neighborhood can be defined around the reference position obtained at step S405 with a predefined threshold, and a limited number of points within the neighborhood can be sampled as candidate positions.

In one embodiment, it is possible to take one or more actions as listed above as the process for generating a number of candidate positions usable for refilling the candidate position group.

In one embodiment, in order to enhance the coverage of the candidate positions, the candidate position group $C^f$ can be further enlarged by a number of positions generated based on the reference position and the existing candidate positions in the candidate position group. In one embodiment, the candidate group $C^f$ can be calculated by:

$$C^f = \{\alpha \times x^f + (1-\alpha) \times y^f | y^f \in C^f, 0 \leq \alpha \leq 1\} \quad (5)$$

where $x^f$ represents the reference position, the group $C^f$ is generated at step S404, and a represents a set of limited number of sample points between 0 and 1, e.g., $\alpha=[0, 0.1, 0.2, \ldots, 1.0]$.

Therefore, this optional step may add a plurality of positions between the reference position and each of the existing candidate positions in the candidate group into the candidate position group $C^f$. As a result, a large number of candidate positions are included in the candidate position group which is advantageous for later process. However, this optional step is useable for a non-empty candidate position group. For example, this step will not be carried out if the candidate position group is empty after step S406.

In one embodiment, a position calibration process may be utilized for obtaining even more accurate estimation. In practice, a perceptual position of an audio object perceived by a listener would possibly deviate slightly from the calculated position as previously described. For example, an audio object intended to appear behind the listener's head is prone to induce a larger deviation, because energies of channels behind may be attenuated more than those from the front. In order to make the estimated positions as close as possible to the perceptual ones, calibration processes may be applied either to an audio object of multi-channel format or directly to the estimated positions. In one embodiment, a gain can be applied to each of the input channels of an audio object to increase or reduce the energy level of the audio object. In other words, the energy of one or more channels may be attenuated before calculating the energy value for each of the plurality of channel of each of the plurality of frames. In another embodiment, a shifting operation can be applied to each of the estimated positions or candidate position group. By way of example when applied to each of the estimated positions, this calibration process may take place after the estimated position is obtained and can be adjusted for each of the plurality of frames. Alternatively, when applied to the candidate position group, this calibration process may take place when generating the candidate position group, which allows adjusting the calibration across the plurality of frames.

The value of the gain is dependent on predefined physical positions for the plurality of channels. For example, in one embodiment, a value 0.5 applied respectively to a left rear channel and a right rear channel of an input audio content of 5.1 format will attenuate the energy level by −3 dB, compared with a value 1.0 applied to the rest of channels without attenuation. This process simulates the phenomenon that energy reaching ears from the behind attenuates more than that from the front.

The amount of shifting is dependent on where the audio object is from. For example, for an audio object from the front of a room, no shift operation is needed; while for an audio object from behind, a shifting operation is desirable which moves the audio object a bit to perceive a calibrated position.

In one embodiment, the selection of one estimated position from the generated candidate position group for each of the plurality of frames of the audio object at step S202 may be achieved by selecting the estimated position based on a smallest sum of distances between the candidate positions for each adjacent two of the plurality of frames.

Specifically, a global cost function may be used for selecting optimal positions from the first frame to the last frame across an audio object. The global cost function takes account of the distances between each of candidate positions for one frame and each of candidate positions for the next frame, and intends to determine a plurality of estimated positions from the first frame to the last frame of the audio object by considering the sum of the distances between each pair of the adjacent frames. As a result, an optimal path is constituted by this multi-frame tracking process as the estimated trajectory. This process can be called a multi-frame tracking process, which is applicable to the correspondence approach and the hybrid approach for obtaining a smooth trajectory. On the other hand, a simple smoothing on the estimated positions over frames can be applied to the energy-weighted approach.

The candidate position group for the f-th frame can be denoted as $C^f$, $f=1, \ldots, F$, which consists of M(f) candidate positions $p_i^f$. In one embodiment, $C^f$ can be calculated by:

$$C^f = \{p_i^f | i=1, \ldots, M(f)\} \quad (6)$$

Figure 5:
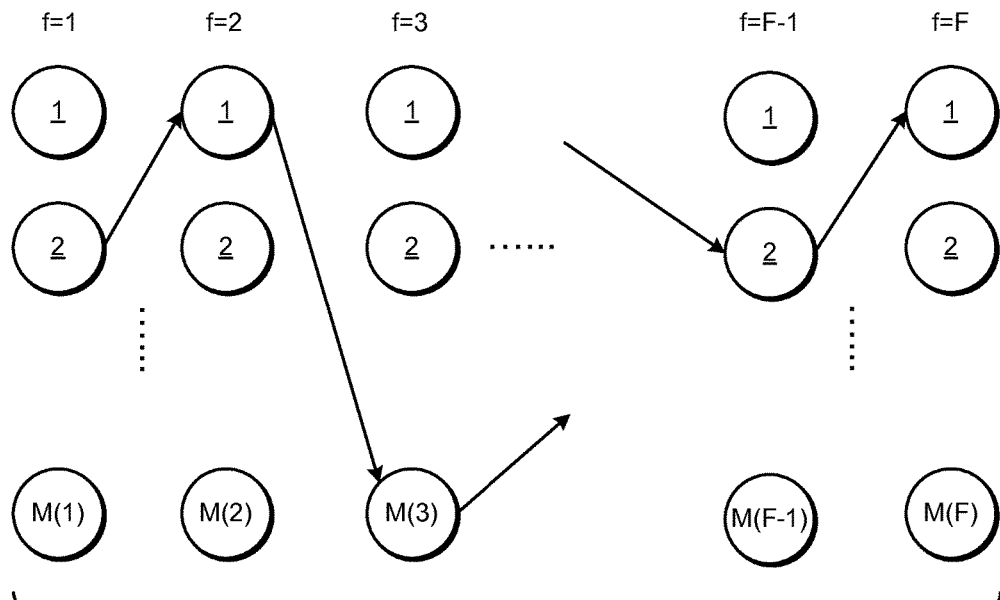
FIG. 5 illustrates an example of seeking a path from the first frame to the last frame of an audio object in accordance with example embodiments.

The size of the candidate position group may vary over frames. As shown in FIG. 5, the multi-frame tracking process aims to seek a trajectory from the first frame to the last frame. At each frame, only one of the candidate positions is selected from the candidate position group. After the estimated positions for the plurality of frames are confirmed, a trajectory may be automatically generated based on the selected estimated positions. All in all, the multi-frame tracking process selects an optimal position for each of the plurality of frames, and the selection of the estimated position for each of the plurality of frames is optimized globally with respect to the rest of the plurality of frames.

To seek an optimal trajectory, in one embodiment, it can be optimized by minimizing an objective function as below:

$$\min f(p_i^1, p_j^2, \ldots, p_m^F) \quad (7)$$

where $p_i^f \in C^f$; i represents the index of candidate positions in the first frame, i.e., $i=1, 2, \ldots, M(f); f=1, 2, \ldots, F$; j represents the index of candidate positions in the second frame, i.e., $j=1, 2, \ldots, M(f); f=1, 2, \ldots, F$; m represents the index of candidate positions in the last frame, i.e., $m=1, 2, \ldots, M(f); f=1, 2, \ldots, F$; and where $f(p_i^1, p_i^2, \ldots, p_m^F)$ represents a predefined cost function, measuring the amount of costs incurred in a trajectory.

The above optimization tries to seek an optimal trajectory with a minimal cost value, from $M(1) \times M(2) \times \ldots \times M(F)$ possible combinations of $(p_i^1, p_j^2, \ldots, p_m^F)$. The definition of the cost function depends on a specific requirement. For example, in one embodiment, the cost function can be defined as:

$$f(p_i^1, p_i^2, \ldots, p_m^F) = \sum_{f=1}^{F-1} \| p_i^f - p_j^{f+1} \| \quad (8)$$

where $\| p_i^f - p_j^{f+1} \|$ represents the distance between the position $p_i^f$ and $p_j^{f+1}$.

By calculating all the possible distances, a smooth trajectory can be generated. In one embodiment, if there is a predefined preference for passing through a particular candidate position for one of the plurality of frames, a set of cost $c_i^f$ may be assigned to those candidate positions, and in one embodiment, Equation (8) will become:

$$f(p_i^1, p_j^2, \ldots, p_m^F) = \sum_{f=1}^{F-1}(\|p_i^f - p_j^{f+1}\| + c_i^f) \quad (9)$$

For example, in one embodiment, the definition of cost $c_i^f$ can be:

$$c_i^f = \delta \times h(d_i^f) \quad (10)$$

where $d_i^f$ represents the distance between the i-th candidate panning vector (or gain vector) and the calculated panning vector (or gain vector) at the f-th frame, the function h is a class of functions whose value decreases with the increase of the value of $d_i^f$, for example, in one embodiment, $h(d_i^f) = e^{-\lambda \times d_i^f}$, and $\delta$ represents a balance factor between h and $\|p_i^f - p_j^{f+1}\|$ in Equation (9).

Alternatively, in another embodiment, if there are preferences to selecting particular trajectory, a set of weights $\omega_{ij}^f$ can be added into Equation (8) for making the trajectory prone to pass particular candidate positions, and in one embodiment, the cost function can be rewritten as:

$$f(p_i^1, p_j^2, \ldots, p_m^F) = \sum_{f=1}^{F-1} \omega_{ij}^f \times \|p_i^f - p_j^{f+1}\| \quad (11)$$

where $\omega_{ij}^f$ represents the preference of jumping from position i to position j for the f-th frame.

The lower the value $\omega_{ij}^f$ is, the higher possibility that the path i→j is selected. In an extreme case, the value of $\omega_{ij}^f$ can be set to infinite, meaning the jump from the position i to the position j is least wanted. As $h(d_i^f)$ in Equation (10) partially represents a confidence score of passing a candidate position, $\omega_{ij}^f$ can be derived, in one embodiment, by:

$$\omega_{ij}^f = h(d_i^f) \times h(d_j^{f+1}) \quad (12)$$

By involving either $c_i^f$ into Equation (9) or $\omega_{ij}^f$ into Equation (11), it is possible to determine the estimated position in accordance with a preferred trajectory of all of the possible trajectories formed by all of candidate positions for the plurality of frames of the audio object. The preferred trajectory is obtained by allowing for at least one of the candidate positions for at least one of the plurality of frames being prone to be selected as the estimated position.

As there are totally M(1)×M(2)× . . . ×M(F) candidate combinations of $(p_i^1, p_j^2, \ldots, p_m^F)$, it requires intensive computation to enumerate each of the possible trajectories to obtain the smallest sum of distances between the candidate positions for each adjacent two of the plurality of frames. Several dynamical programming techniques may be applied to minimize the computation of generating the optimal trajectory. In one embodiment, one of the techniques can be:

Initialize $C_i^1 = 0$, $H_i^1 = 0$, i=1, . . . , M(1), where $C_i^f$ stores the minimal accumulated cost value of the i-th candidate position up to the f-th frame, and $H_i^f$ stores the index of the position at the (f-1)-th frame, from which the value of $C_i^f$ is minimal.

For f=2 to F
1) Calculate the cost of jumping from the i-th position to the j-th position at the f-th frame, i.e., $d_{i,j}^f = f(p_i^{f-1}, p_j^f)$.
2) Compute the minimal accumulated cost of the j-th position up to the f-th frame via $$C_j^f = \min_i(d_{i,j}^f + C_i^{f-1}),$$

and store the index of the position of the (f-1)-th frame via $$H_i^f = \operatorname{argmin}_i(d_{i,j}^f + C_i^{f-1}).$$

End
Find the minimal cost position $$p_{I_*^F}^F$$

at the last frame with $$I_*^F = \arg\min_i C_i^F.$$

The position indexes of the mini-cost path can be composed by the following reverse equation:

$$I_*^{f-1} = H_{I_*^f}^f, f = 2, \ldots F$$

Thus the optimal path can be represented as $$\{p_{I_*^1}^1, \ldots, p_{I_*^F}^F\}.$$

In one embodiment, a dimensional transformation process at the step S204 may be utilized for either converting the estimated position for each of the plurality of frames from 2-dimensional format to 3-dimensional format, based on at least one of a content type of the audio object and the estimated position for each of the plurality of frames, or converting the estimated position for each of the plurality of frames from a 3D format to a 2D format by removing information of one dimension from the estimated position.

With the advance of audio processing techniques, the audio scene created by the audio content of a multi-channel format gradually evolves from a 2D plane into a 3D space, by adding a number of overhead speakers. As the 3D audio scene provides more immersive listening experience with a number of overhead channels, it is desirable to estimate a 3D trajectory for an audio object. Most of the audio contents do not contain information on height, because the majority of contents of a multi-channel format on the market are based on surround 5.1 or 7.1. As a result, the estimated trajectory can be generated in a 2D plane ($x^f$, $y^f$). In order to extend these audio contents from a 2D format to a 3D format, it is desired to add a height dimension $z^f$.

The addition of height can be either done manually, or automatically by applying some rules of thumb. These rules are either inspired from a mixer's common behavior, or derived under the constraints of current rendering techniques. For example, in one embodiment, if the estimated position of an audio object lies close to the center of a room, the audio object can be put into overhead speakers by setting the height to a predefined value regardless of the content type. This can be derived from a mixer's common behavior, because the mixers usually intentionally arrange an audio object at the center of a room if they interpret the audio object as to be played by overhead speakers.

In another embodiment, the height can be set to zero for an audio object with its estimated position close to a wall of the room. An estimated position near a side confined by the plurality of speakers is likely to be an audio object having no information on height, because mixers cannot easily generate an audio object perceived from the sky by using speakers on one side. The height can be commonly represented as a function g(x, y) with a particular space, such as a semi-sphere. In the semi-sphere, the value of height reaches one (e.g., the maximum value) at the center of the space, and gradually decreases to zero when moving from the center towards walls.

In yet another embodiment, if the content type of an audio object belongs to a predefined type (which is normally not in a plane, e.g., bird, thunder, rain, etc.), the audio object can be put into overhead speakers by setting the height to a predefined value. The height can be represented as a function $f(c)$ where c is the content type.

If the content type of the audio object indicates that it is an overhead object, the height is set to a pre-defined value by the function $f(c)$; otherwise, function g(x, y) is used to obtain the value of height based on the estimated position of the audio object. Alternatively, in one embodiment, the overall function can be h(x, y, c), where h(x, y, c)=g(x, y)×$f(c)$.

Information on the content type can be annotated manually or obtained by artificial intelligence techniques automatically. It should be noted that the source or completeness of an audio object is not necessary. The audio object may be either from off-the-shelf pure object content, in which audio objects are not mixed with each other, or from the output of some audio object extraction algorithms. For the off-the-shelf audio object, it is safe to apply these rules of thumb in order to add the value of height.

However, for the audio object which is automatically extracted from the audio content of a multi-channel format, it should take into account the fact that some energies of the same audio object may still reside in the plane (floor speakers). For example, for a 7.1 input, an audio object is put into overhead speakers with the dimension of height calculated via the function g(x, y) or $f(c)$. Due to imperfect audio object extraction, not all energies/spectral of the audio object are put into overhead speakers that a portion still resides in the plane. There is certain risk that the playback image is not perceived as a concentrated object. In order to alleviate the risk, in one embodiment, an adaptive height estimation is proposed by introducing a scaling factor s between zero and one, as:

$$z = s \times z^* \quad (13)$$

where z* represents the height estimated from g(x, y) and/or $f(c)$.

The value s can be set by taking into account the residual energies in the plane. For example, it can be set to one when no residual energies are in the plane or to zero if almost all energies of an audio object are in the plane. A ratio of residual energy in the plane to overall energy of the audio object can be denoted as r. In one embodiment, s can be estimated by s=1−r, with its value linearly scaled with r. In another embodiment, s can be estimated by $$s = \frac{2}{1 + e^{\lambda \times r}},$$

where a parameter λ controls the slope rate of the function, with its values scaled with r nonlinearly. The value of λ can be tuned with real data.

In one embodiment, a 3D-to-2D transformation is also included. This is useful for a playback system without overhead speakers. Such transformation needs to convert the trajectory from 3D format to 2D format. A simple way to achieve the transformation is to discard the dimension of height recorded in 3D format and use the positions in one plane for representing the audio content.

Perceptual Size Estimation

Figure 6:
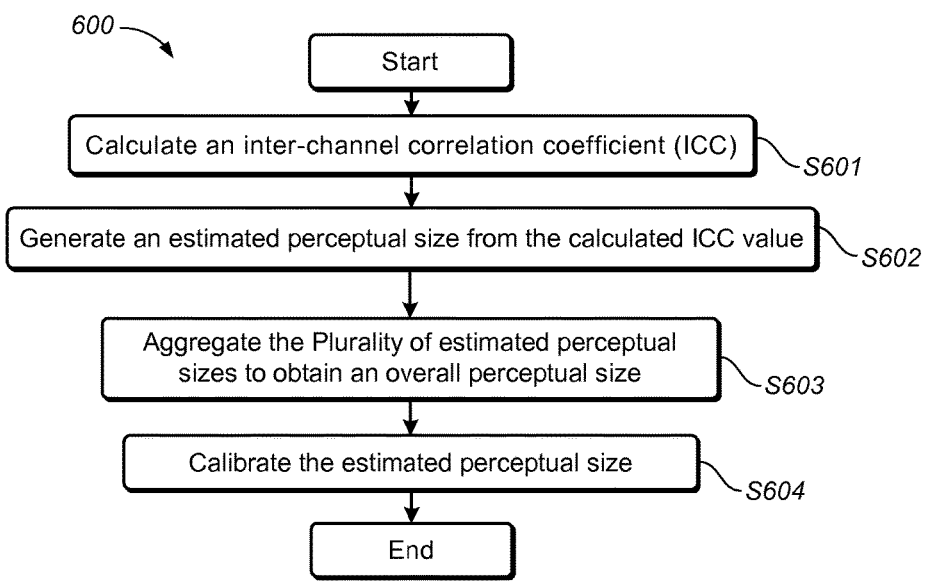
FIG. 6 illustrates a flowchart of a method for processing an audio object in order to estimate the perceptual size thereof in accordance with an example embodiment.

Reference is now made to FIG. 6 which shows a flowchart of a method 600 for processing an audio object in order to estimate the perceptual size thereof in accordance with example embodiments disclosed herein.

When an audio object of a multi-channel format is played by a multi-channel system, there are, for example, phase differences among input signals. As a result, when the signals are played by various transducers, a listener may perceive the audio object to be a phantom with certain area or size rather than a concentrated spot. Naturally, like information on trajectory or position of an audio object, it is also desirable to estimate a perceptual size of the audio object.

As described previously, if two identical signals are played by two speakers 100 simultaneously, the listener would possibly perceive the audio object to be a point phantom as illustrated at the left side of FIG. 1, where the ICC value is equal to one. In practice, the mixer would usually not render an audio object to have a point phantom, but rather assign an ICC value between zero and one. In one embodiment, the perceptual size is also a value between zero and one, where a perceptual size of zero means a point phantom and the perceptual size of one means a size extending from the one speaker to another speaker. Therefore, the perceptual size is independent of a physical distance between two speakers and determined by the inter-channel correlation, i.e., ICC. In the following, the steps of the method 600 are presented.

Figure 7:
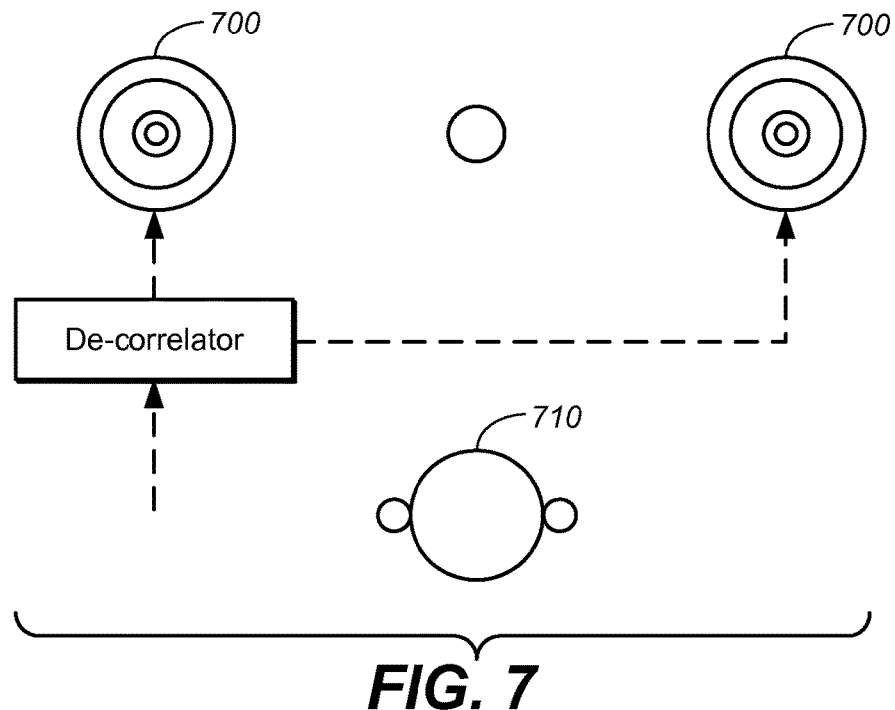
FIG. 7 illustrates an example of performing a de-correlation process on an input audio object for obtaining a correspondence between the perceptual size and the ICC value in accordance with an example embodiment.

At step S601, an inter-channel correlation coefficient (ICC) of each pair 700 of the plurality of channels as shown in FIG. 7 is calculated in time domain or frequency domain. As the perceptual size is a parameter based on individual perception, it is difficult to use analytic techniques to derive its dependency on the ICC values. A frequently-used method is to resort to listening experiments to collect empirical data, and then use statistical techniques to find an optimal correspondence or function well-fitting the empirical data. For example, in one embodiment, a function after curve fitting is illustrated in FIG. 8.

Figure 8:
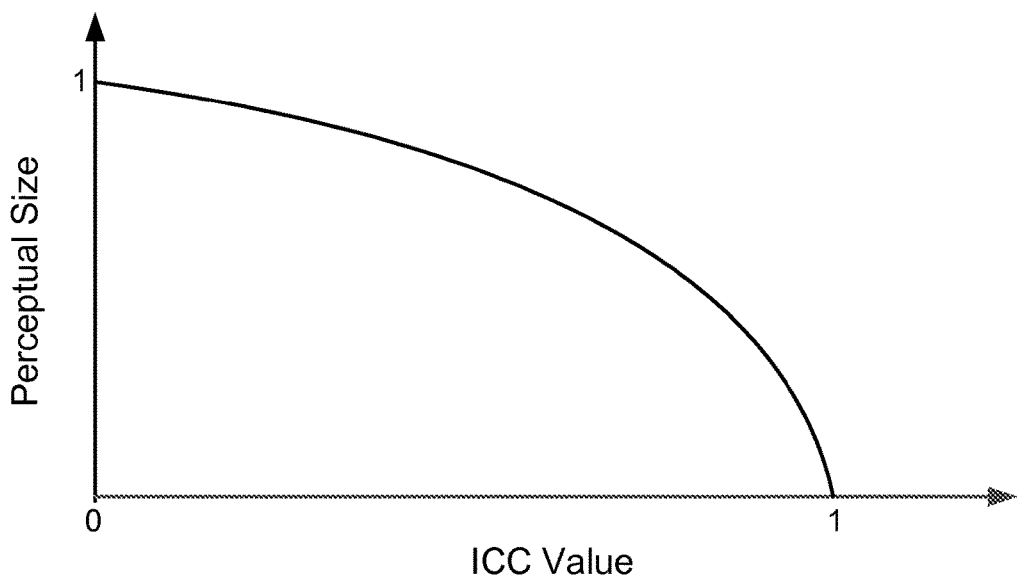
FIG. 8 illustrates the value change of the perceptual size as a function of ICC value in accordance with an example embodiment.

The curve as illustrated in FIG. 8 shows a relationship between the perceptual size and the ICC value. It can be observed that the perceptual size scales nonlinearly with the ICC value.

To generate the ICC value from the input audio signal, a few procedures need to be carried out. As an example of experimental setting, two speakers 700 are placed in front of a listener 710 as shown in FIG. 7. FIG. 7 illustrates an example of a pair of speakers 700 placed in front of the listener 710, while pairs of speakers can be arranged in other places as well. The audio signal is de-correlated to generate two paths of signals, which enter the left and right speakers 700 respectively. The ICC of these two signals is controlled by the component of de-correlation, and in one embodiment, its values can be calculated in time domain by:

$$ICC = \max_{|d|<=D} \left| \frac{\sum_t x_1(t+d) \, x_2(t)}{\sqrt{\sum_t x_1(t+d)^2} \sqrt{\sum_t x_2(t)^2}} \right| \quad (14)$$

where $x_1(t)$ and $x_2(t)$ represent time-domain samples, t represents time, d represents time difference between two samples, and D represents the size of a window.

When d is non-zero, both $x_1$ and $x_2$ use their individual samples which overlap with each other. In another embodiment, the value of the ICC can also be calculated in frequency domain, for example, for the b-th sub-band:

$$ICC(b) = \left| \frac{Re\left(\sum_t X_1(b,t) \times X_2(b,t)^*\right)}{\sqrt{\sum_t \|X_1(b,t)\|^2} \sqrt{\sum_t \|X_2(b,t)\|^2}} \right| \quad (15)$$

where $X_2(b,t)^*$ represents the conjugate of $X_2(b,t)$, $\|X_1(b,t)\|$ represents the module of a complex number, and the operation of Re( ) represents real part.

In one embodiment, the full-band ICC can be calculated via:

$$ICC = \frac{1}{N} \sum_{b=1}^{N} ICC(b) \quad (16)$$

For each of the ICC values, listeners are asked to record the perceptual size of the audio object. The averaged value of multiple listeners is output as the final value. It is to be noted that each pair of the speakers can result in their own ICC value and each pair of the speakers respectively defines a correspondence between perceptual sizes and ICC values.

In view of the above, the correspondence is predefined by the position of a pair of speakers. For each pair of speakers, in one embodiment, the correspondence between a plurality of ICC values and a plurality of perceptual sizes may be represented in a form of look-up table for efficient implementation on the fly. Alternatively, in another embodiment, the correspondence may be represented in a form of a continuous function $f(ICC)$, as illustrated by FIG. 8. The function can be derived by using curve fitting techniques on the experimental data. Therefore, at step S602, an estimated perceptual size can be generated from the calculated ICC value at step S601, based on either the look-up table or the function $f(ICC)$ obtained by curve-fitting techniques.

After the estimated perceptual size is generated at step S602, the plurality of estimated perceptual sizes can be aggregated at step S603 in order to obtain an overall perceptual size of the audio object.

In FIG. 9, three speakers 910, 930 and 940 are activated to render an audio object. The three activated speakers 910, 930 and 940 produce an overall phantom 960, shown by a dashed circle. As the number of speakers is more than two, it cannot apply the correspondence directly since the correspondence provides mapping between a single pair of speakers.

In order to estimate the perceptual size by more than two speakers, an overall phantom is assumed to be the aggregation of a series of sub-phantoms, each generated by a pair of the plurality of channels. As an example shown in the right figure of FIG. 9, the overall phantom 960 is regarded as the aggregation of sub-phantoms 970, 980 and 990, respectively generated by pairs (910, 940), (930, 940) and (910, 930). An aggregated size s represents a function of the respective size for each of sub-phantoms sp. In one embodiment, sp can be estimated by looking up an appropriate look-up table or function as illustrated by FIG. 8 with the ICC value calculated via Equation (14) or (16). The selection of an appropriate look-up table may depend on the orientation of different speakers. Given that three correspondences between pairs (910, 940), (930, 940) and (910, 930) are predefined based on the listening experiments for the system including five speakers 910, 920, 930, 940 and 950 as arranged in FIG. 9, which respectively corresponds to the left/right sides, front side and left/right rear sides, the correspondences between other pairs can also be approximated by the three predefined correspondences. A method to obtain the size estimation from those of sub-phantoms may use a linear function (17) or a max function (18), together with a scaling factor $\omega_p$:

$$s = \sum_p s_p \times d_p \times \omega_p \quad (17)$$

$$s = \max_p (s_p \times d_p \times \omega_p) \quad (18)$$

where $d_p$ represents the relative distance of the p-th speaker pair and $\omega_p$ represents a scaling factor.

In one embodiment, the value of $d_p$ can be set to a ratio of the distance between the p-th pair of the plurality of channels to the room size. For example, assuming that the room is a square with the side length being 1.0, the distance $d_p$ for the pairs (910, 940), (930, 940) and (910, 930) are calculated respectively as 1.0, 1.12 and 0.5.

In one embodiment, $\omega_p$ can be determined by some measurements of channels within a pair of the plurality of channels and closely related to listeners' perception. For example, it can be determined by either of following factors.

If all the pairs of the plurality of channels are treated equally, $\omega_p$ can be set to, for example $$\omega_p = \frac{1}{N}$$

for Equation (17) or $\omega_p=1$ for Equation (18). The setting for Equation (17) is to output the size estimation of a phantom image as the average of its sub-phantom images 970, 980 and 990; while the setting for Equation (18) outputs the maximum sub-phantom as the overall phantom or overall estimated perceptual size regardless of the other sub-phantoms. This maximum setting works when the energies of all pairs of the plurality of channels are equal or similar, but the accuracy is affected when some pairs of the plurality of channels have higher ICC values but lower energies.

In one embodiment, $\omega_p$ can be calculated by taking energy into consideration as below:

$$\omega_p = \frac{E_p}{\sum_p E_p} \quad (19)$$

where $E_p$ represents the energy of the p-th pair of the plurality of channels for both Equations (17) and (18).

Equation (19) is based on the understanding that the pair of the plurality of channels with higher energy may contribute more to the aggregated size s than the pair with lower energy. However, energy may not directly reflect the listener's perception of the playback, because the energy belongs to a physical objective measurement while the perceptual size belongs to a subjective measurement. Therefore, in another embodiment, loudness may be used to weigh the contribution of each pair of the plurality of channels for estimating the perceptual size. Therefore, in one embodiment, the scaling factor $\omega_p$ steered by the loudness measurement can be calculated by:

$$\omega_p = \frac{L_p}{\sum_p L_p} \quad (20)$$

In view of the above, the overall estimated perceptual size can be aggregated by averaging the plurality of generated estimated perceptual sizes as the overall estimated perceptual size via Equation (17) in one embodiment, or selecting a maximum one of the plurality of generated estimated perceptual sizes as the overall estimated perceptual size via Equation (18) in another embodiment.

In one embodiment, step S604 can be carried out for calibrating the estimated perceptual size, by for example comparing a perceptual size of the audio object of the multi-channel format in playback with a perceptual size of the audio object converted to the mono-channel format having an estimated perceptual size in playback.

Considering that Equations (17) and (18) are used for approximating the perceptual size, meaning there may be a difference between the estimated overall perceptual size and the actual perceptual size. Therefore, in order to obtain a more accurate size estimation, in one embodiment, the estimated perceptual size is calibrated for being as close as possible to the ground-truth one perceived by human. The calibration may be dependent on the spatial positions of an audio object.

One example of an experiment for calibrating is illustrated in FIG. 10. In this example, an audio object is rendered with its multi-channel representations at the position (x, y, z) in the left figure of FIG. 10 and a listener 1060 under the test is asked to record a perceptual size P(x, y, z) of an unprocessed audio object. In the middle of FIG. 10, the size is estimated via steps, such as S601 to S603, or any other off-the-shelf methods, and the audio object is re-rendered with the estimated overall object size and/or the estimated position. Then the listener is asked to record a perceptual size Q(x, y, z) for the processed audio object. In one embodiment, a calibration factor $\beta(x, y, z)$ can be calculated by:

$$\beta(x, y, z) = \frac{P(x, y, z)}{Q(x, y, z)} \quad (21)$$

In one embodiment, as shown by FIG. 11, a whole space 1100 can be divided into several sub-spaces 1160, 1170, 1180 and 1190 to save efforts spent on the calibration without compromising the performance. The space 1100 is confined by the speakers 1110, 1120, 1140 and 1150 into several sub-spaces. Specifically, as illustrated by FIG. 11, the sub-spaces, regardless of height, are of three different values with sub-spaces 1170 and 1180 being equal. All positions within a single sub-space share a calibration factor, the value of which is collected by the experiment for calibrating, e.g., as show in FIG. 10. In order to further reduce efforts to obtain β(x, y, z), in one embodiment, a limited number of interested positions within a sub-space, rather than all interested positions, are selected and the calibration factors of these positions are calculated and averaged as the calibration factor of the sub-space.

Alternatively, in one embodiment, the whole room can be divided, along the height dimension, into horizontal space and overhead space. The horizontal space further follows the division procedures, as presented previously, to be divided into 1060, 1070, 1080 and 1090; while the overhead space is treated as a whole and shares a same calibration factor.

In one embodiment, a special application is provided, where some audio objects in a 2D plane (x, y) are converted into a 3D space (x, y, z) in order to create a three-dimensional audio scene for more immersive listening experience, by adding a new dimension of height z. The calibration factor β(x, y, z) can be represented as an explicit function defined on the newly-added dimension z by:

$$\beta(x, y, z) = 2 \times \frac{\beta_{max}}{1 + e^{\alpha(1-z)}} \quad (22)$$

where α represents a constant larger than zero.

A higher value of height means a bigger size for more immersive experience. When z in Equation (21) is one, the calibration factor reaches the maximum value $\beta_{max}$; as z decreases from one to zero, the calibration factor decrease from $$\beta_{max} \text{ to } 2 \times \frac{\beta_{max}}{1 + e^{\alpha}}.$$

By tuning the values of $\beta_{max}$ and α based on listening experiments, an optimal setting of calibration factors can be obtained.

Figure 12:
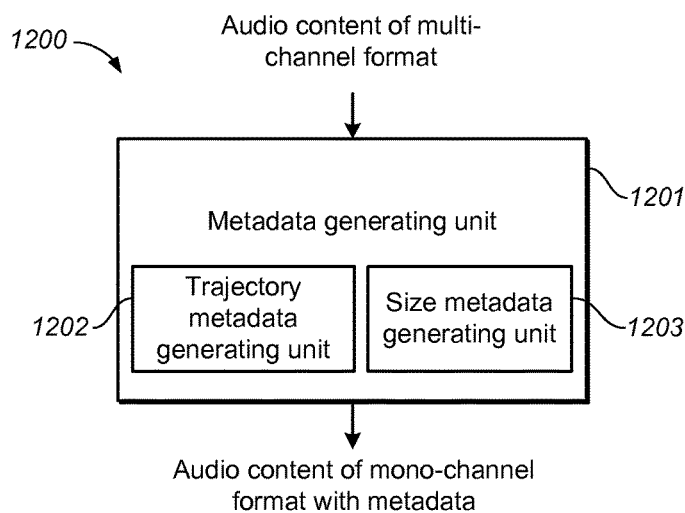
FIG. 12 illustrates a block diagram of a system for the audio object processing in accordance with an example embodiment.

FIG. 12 shows a block diagram of a system 1200 for audio content processing in accordance with one example embodiment as shown. As shown, the system 1200 comprises a metadata generating unit 1201 configured to generate the metadata associated with the audio object. The metadata generating unit 1201 includes at least one of a trajectory metadata generating unit 1202 configured to generate an estimated trajectory of the audio object, and a size metadata generating unit 1203 configured to generate an estimated perceptual size of the audio object, the perceptual size being a perceived area of a phantom of the audio object produced by at least two transducers.

In some embodiments, the trajectory metadata generating unit 1202 may comprise a candidate position generating unit configured to generate a candidate position group including at least one candidate position for each of a plurality of frames of the audio object; a position selecting unit configured to select an estimated position from the generated candidate position group for each of the plurality of frames based on a global cost function for the plurality of frames; and a trajectory generating unit configured to generate the trajectory with the selected estimated positions across the plurality of frames as the estimated trajectory.

In these embodiments, the candidate position generating unit may comprise a correspondence defining unit configured to define a position correspondence between a plurality of panning vectors and a plurality of positions; an energy calculating unit configured to calculate an energy value for each of the plurality of channels and the panning vector for each of the plurality of frames of the audio object, the panning vector being a group of ratios with each of the ratio equal to the energy value of one of the plurality of channels over a sum of the energy values of the plurality of channels; a panning vector preserving unit configured to preserve a plurality of panning vectors of the plurality of channels, with differences between the preserved panning vectors and the calculated panning vectors being within a predefined value; and a group generating unit configured to generate the candidate position group for each of the plurality of frames in accordance with the preserved panning vectors based on the position correspondence. Preferably, the candidate position generating unit may further comprise a reference position calculating unit configured to calculate a reference position of the audio object for each of the plurality of frames based on the calculated panning vector and a predefined position for each of the plurality of channels; and a position removing unit configured to remove the candidate position from the candidate position group in response to a distance between a candidate position and the reference position being greater than a predefined threshold. Accordingly, the group generating unit may comprise a group testing unit configured to detect whether the candidate position group is empty or not; and a group refilling unit configured either refill the predefined position for the frame into the candidate position group, or refill a position into the candidate position group, a distance between the refilled position and the reference position being below a predefined threshold, in response to the candidate position group for one of the plurality of frames being empty.

In some embodiments, the position selecting unit may comprise an estimated position selecting unit configured to select the estimated position based on the smallest sum of distances between the candidate positions for each adjacent two of the plurality of frames.

Further, in some embodiments, the trajectory metadata generating unit 1203 may further comprise a dimension converting unit configured to either convert the estimated position for each of the plurality of frames from a two-dimensional (2D) format to a three-dimensional (3D) format, based on at least one of a content type of the audio object and the estimated position for each of the plurality of frames, or convert the estimated position for each of the plurality of frames from a 3D format to a 2D format by removing information of one dimension from the estimated position.

In some embodiments, the size metadata generating unit 1203 may comprise an ICC calculating unit configured to calculate an inter-channel correlation coefficient (ICC) of each pair of the plurality of channels in time domain or frequency domain; a size generating unit configured to generate a plurality of estimated perceptual sizes from the ICCs of pairs of the plurality of channels; and a size aggregating unit configured to aggregate the plurality of estimated perceptual sizes in order to obtain an overall estimated perceptual size of the audio object. In these embodiments, the size generating unit may comprise an ICC converting unit configured to determine the estimated perceptual size based on a predefined correspondence between the ICCs and a plurality of perceptual sizes.

In some embodiments, the size aggregating unit may comprise an overall size estimating unit configured to either average the plurality of generated estimated perceptual sizes as the overall estimated perceptual size, or select a maximum one of the plurality of generated estimated perceptual sizes as the overall estimated perceptual size.

Furthermore, in some embodiments, the size metadata generating unit 1203 may further comprise a size calibration unit configured to calibrate the estimated perceptual size by comparing a perceptual size of the audio object of the multi-channel format in playback with a perceptual size of the audio object with the generated metadata having an estimated perceptual size in playback. Preferably, the size calibration unit may comprise a space dividing unit configured to divide a space constructed by a plurality of transducers to a plurality of sub-spaces for the calibration.

For the sake of clarity, some optional components of the system 1200 are not shown in FIG. 12. However, it should be appreciated that the features as described above with reference to FIGS. 1-11 are all applicable to the system 1200. Moreover, the components of the system 1200 may be a hardware module or a software unit module. For example, in some embodiments, the system 1200 may be implemented partially or completely with software and/or firmware, for example, implemented as a computer program product embodied in a computer readable medium. Alternatively or additionally, the system 1200 may be implemented partially or completely based on hardware, for example, as an integrated circuit (IC), an application-specific integrated circuit (ASIC), a system on chip (SOC), a field programmable gate array (FPGA), and so forth. The scope of the example embodiments are not limited in this regard.

Figure 13:
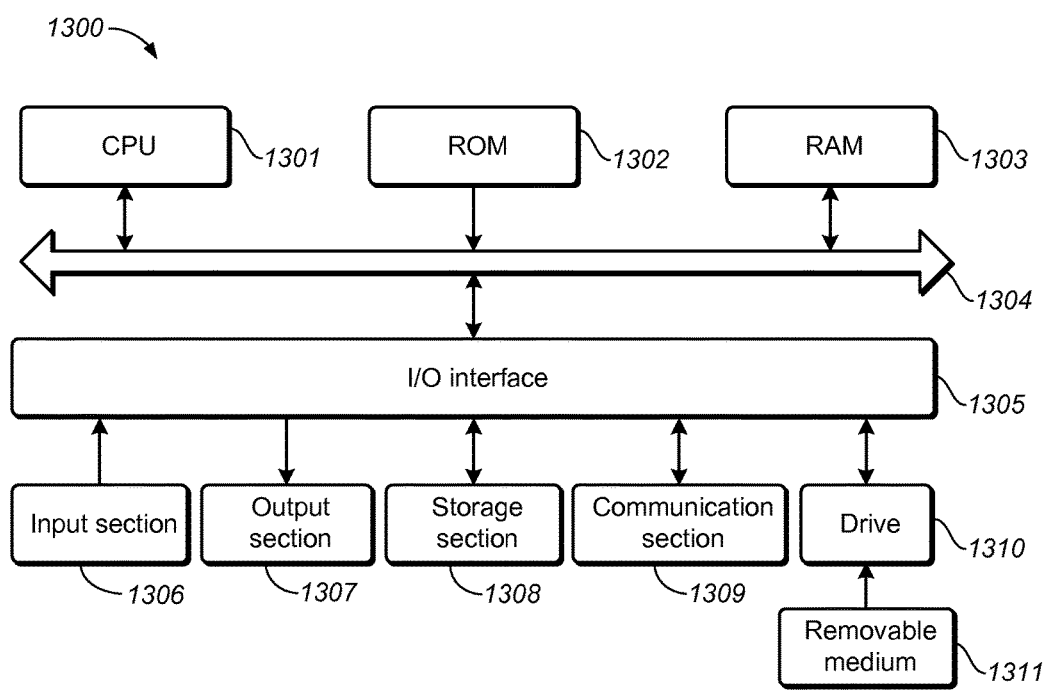
FIG. 13 illustrates a block diagram of an example computer system suitable for the implementing embodiments.

FIG. 13 shows a block diagram of an example computer system 1300 suitable for implementing embodiments disclosed herein. As shown, the computer system 1300 comprises a central processing unit (CPU) 1301 which is capable of performing various processes in accordance with a program stored in a read only memory (ROM) 1302 or a program loaded from a storage section 1308 to a random access memory (RAM) 1303. In the RAM 1303, data required when the CPU 1301 performs the various processes or the like is also stored as required. The CPU 1301, the ROM 1302 and the RAM 1303 are connected to one another via a bus 1304. An input/output (I/O) interface 1305 is also connected to the bus 1304.

The following components are connected to the I/O interface 1305: an input section 1306 including a keyboard, a mouse, or the like; an output section 1307 including a display, such as a cathode ray tube (CRT), a liquid crystal display (LCD), or the like, and a speaker or the like; the storage section 1308 including a hard disk or the like; and a communication section 1309 including a network interface card such as a LAN card, a modem, or the like. The communication section 1309 performs a communication process via the network such as the internet. A drive 1310 is also connected to the I/O interface 1305 as required. A removable medium 1311, such as a magnetic disk, an optical disk, a magneto-optical disk, a semiconductor memory, or the like, is mounted on the drive 1310 as required, so that a computer program read therefrom is installed into the storage section 1308 as required.

Specifically, in accordance with the example embodiments disclosed herein, the processes described above with reference to FIGS. 1-11 may be implemented as computer software programs. For example, embodiments comprise a computer program product including a computer program tangibly embodied on a machine readable medium, the computer program including program code for performing methods 200, 300, 400 and/or 600. In such embodiments, the computer program may be downloaded and mounted from the network via the communication section 1309, and/or installed from the removable medium 1311.

Generally speaking, various example embodiments may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the example embodiments may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in a sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Various modifications, adaptations to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other embodiments of the inventions set forth herein will come to mind of one skilled in the art to which these embodiments of the invention pertain to having the benefit of the teachings presented in the foregoing descriptions and the drawings.

Accordingly, the example embodiments may be embodied in any of the forms described herein. For example, the following enumerated example embodiments (EEEs) describe some structures, features, and functionalities of some aspects of the example embodiments.

EEE 1. A method for the position estimation of an object from audio content, the audio content being of a format based on a plurality of channels, the method comprising:
applying the position estimation on each individual frame of an object to generate a set of candidate positions for that frame, based on the energy distribution among channels or/and panning tools;
selecting an optimal path as the trajectory of the object from the candidate sets, by minimizing a pre-defined cost function with dynamical programming techniques;
performing transformation operation on the trajectory optionally.

EEE 2. The object as recited in EEE 1 can be either in full band or sub band, or/and either complete or incomplete over time.

EEE 3. The method of the position estimation on an individual frame, according to EEE 1, is a hybrid approach combining look-up table approach with or without a reference position.

EEE 4. The look-up table approach, according to EEE 3, involves building a table storing the mapping between pairs of (position, panning (or gain) vector), and a procedure of looking for a set of candidate positions from the table, in which
A panning vector is an energy distribution over channels, normalized by the sum of channel energy, as defined by (1).
A gain vector consists of square roots of entries of a panning vector, as defined by (4).

EEE 5. The procedure of looking for a set of candidate positions, according to EEE 4, involves looking for a set of panning (or gain) vectors from the table, whose distances to the calculated one are less than a pre-defined threshold.

EEE 6. The reference position, as recited in EEE 3, is used to prune the set of candidate positions found by the look-up table method, and the pruning is implemented by introducing a threshold, so that the positions in the candidate set, whose distances to the reference position are larger than the threshold, are removed.

EEE 7. The special treatment when the candidate position set is empty after pruning can be either of
- outputting each physical channel position as an estimated position. It means that multiple estimated positions are outputted for the same object. Or in another word, it outputs multiple objects having the same audio but different positions.
- informing an upper-layer application that the object is not suitable to be re-rendered only with the metadata of positions.
- defining a neighborhood around the reference position (obtained from the energy-weighted method) with a predefined radius, and sampling a limited number of points within the neighborhood as candidate positions.

EEE 8. The set of candidate positions, according to EEE 5, can be optionally enlarged by (5).

EEE 9. The positions estimated in EEE 3 can be calibrated with either of the following operations
- A gain can be applied on at least one input channel signal of an object to boost or reduce its energy (or relative importance);
- A shifting operation can be applied on each estimated position. The amount of shifting is dependent on where an object is from.

EEE 10. A method of the trajectory composition across multiple frames, according to EEE 1, is formulated as an optimization problem (7), and the cost function can be defined based on either of (8), (9) or (11), in which
- The value of $c_i^f$ can be set either according to prior knowledge or by (10).
- The value of $\omega_{ij}^f$ can be set either according to prior knowledge or by (12).

EEE 11. One example of procedures to solve problem (7), according to EEE 10, is to use procedures of the dynamical programming technique for calculating $\{p_{1_*}^1, \ldots, p_{1_*}^F\}$.

EEE 12. The transformation operation, according to EEE 1, involves converting a two-dimensional position into a three-dimensional one, or vice versa.

EEE 13. The determination of height for a two-dimensional position, according to EEE 12, is a function of $h(x, y, c)=g(x, y)\times f(c)$, as one example, where (x, y) are the positions and c is the content category information.

EEE 14. The value of height, according to EEE 13, is further adaptively adjusted with the equation (13), by multiplying an 'adaptive' scaling factor to take into account the residual energies of speakers on the plane.

EEE 15. The scaling factor, according to EEE 14, can be determined by either of
- the equation $s=1-r$, meaning its values linearly scale with r;
- the equation $$s = \frac{2}{1+e^{\lambda \times r}},$$

where the parameter $\lambda$ controls the slope rate of the function, meaning that its values scale with nonlinearly.
- where r is the ratio of residual energy on the plane with regard to the overall energy of the object.

EEE 16. A method for the size estimation of an object from audio content, the audio content being of a format based on a plurality of channels, the method comprising:
- building correspondences between pairs of <perceptual size, ICC value>;
- correlation-based size estimation;
- adaptive position-steered calibration.

EEE 17. The object, as recited in EEE 16, can be either in full band or sub band, or/and either complete or incomplete over time.

EEE 18. The correspondence, as recited in EEE 16, can be either represented as a function or a look-up table. Each correspondence is determined by the position of a speaker pair placed in listening experiments.

EEE 19. The positions of speaker pairs, as recited in EEE 18, can be chosen to be a limited number of representative positions, e.g., front, left/right, and back sides. For each speaker pair, a separated function/correspondence is built. The correspondences of other positions can be approximated by those of the representative positions.

EEE 20. The ICC value, as recited in EEE 16, can be calculated via either the equation (14) or (16).

EEE 21. The correlation-based size estimation, as recited in EEE 16, decomposes the phantom of an object created by more than two speakers as a series of sub-phantoms, each of which is created by a pair of speakers. The size of the object is obtained by either the equation (17) or (18).

EEE 22. The values of the scaling factor in either (17) or (18), as recited in EEE 21, can be set to either (19) or (20).

EEE 23. The method of adaptive position-steered calibration, as recited in EEE 16, can work on the size estimated by the correlation-based method or any other off-the-shelf methods.

EEE 24. The method of adaptive position-steered calibration, as recited in EEE 23, involves the calculation of calibration factors according to (21).

EEE 25. The calibration factors, as recited in EEE 24, is position-dependent, and the size of calibration factor set can be reduced by dividing the whole space into a limited number of representative subspaces, e.g.,
- As shown in FIG. 11, the whole space, regardless of height, is divided into three sub-spaces, which are 1160, 1170, 1180 and 1190 respectively. All positions within a sub-area share a calibration factor.
- Alternatively, the whole room can be divided, along the height dimension, into horizontal space and overhead space. The horizontal space further follows the first division strategy to be divided into 1160, 1170, 1180 and 1190; while the overhead space is treated as a whole and shares the same calibration factor.

EEE 26. The calibration factors, as recited in EEE 24, can be alternatively set to (22) in such a situation where an object from a two-dimensional plane is put into a three-dimensional space by adding a new dimension of height.

It will be appreciated that the embodiments of the invention are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A method for processing audio content, the audio content including at least one audio object of a multi-channel format based on a plurality of channels, the method comprising:

generating metadata associated with the audio object, the metadata including at least one of:
an estimated trajectory of the audio object, and
an estimated perceptual size of the audio object, the perceptual size being a perceived area of a phantom of the audio object produced by at least two transducers,
wherein generating the metadata comprises determining the estimated trajectory by performing actions comprising:
generating a candidate position group including at least one candidate position for each of a plurality of frames of the audio object;
selecting an estimated position from the generated candidate position group for each of the plurality of frames based on a global cost function for the plurality of frames; and
generating a trajectory with the selected estimated positions across the plurality of frames as the estimated trajectory.

2. The method according to claim 1, wherein generating the candidate position group comprises:
defining a position correspondence between a plurality of panning vectors and a plurality of positions;
calculating an energy value for each of the plurality of channels;
calculating a respective panning vector for each of the plurality of frames of the audio object, the panning vector being a group of ratios with each of the ratio equal to the energy value of one of the plurality of channels over a sum of the energy values of the plurality of channels;
preserving a plurality of panning vectors, with differences between the preserved panning vectors and the calculated panning vector being within a predefined value; and
generating the candidate position group for each of the plurality of frames in accordance with the preserved panning vectors based on the position correspondence.

3. The method according to claim 2, wherein generating the candidate position group further comprises:
calculating a reference position of the audio object for each of the plurality of frames based on the calculated panning vector and a predefined position for each of the plurality of channels; and
responsive to a distance between a candidate position and the reference position being greater than a predefined threshold, removing the candidate position from the candidate position group.

4. The method according to claim 3, wherein generating the candidate position group further comprises:
responsive to the candidate position group for one of the plurality of frames being empty, adding the predefined position for the frame into the candidate position group; or
adding into the candidate position group a position, a distance between the added position and the reference position being below a predefined threshold.

5. The method according to claim 1, wherein selecting the estimated position from the generated candidate position group for each of the plurality of frames comprises:
selecting the estimated position based on a smallest sum of distances between the candidate positions for each adjacent two of the plurality of frames.

6. The method according to claim 1, further comprising:
converting the estimated position for each of the plurality of frames from a two-dimensional (2D) format to a three-dimensional (3D) format, based on at least one of
a content type of the audio object and the estimated position for each of the plurality of frames; or
converting the estimated position for each of the plurality of frames from a 3D format to a 2D format by removing information of one dimension from the estimated position.

7. A method for processing audio content, the audio content including at least one audio object of a multi-channel format based on a plurality of channels, the method comprising:
generating metadata associated with the audio object, the metadata including at least one of:
an estimated trajectory of the audio object, and
an estimated perceptual size of the audio object, the perceptual size being a perceived area of a phantom of the audio object produced by at least two transducers,
wherein generating the metadata comprises determining the estimated perceptual size by performing actions comprising:
calculating an inter-channel correlation coefficient (ICC) of each pair of the plurality of channels in time domain or frequency domain;
generating a plurality of estimated perceptual sizes from the ICCs of pairs of the plurality of channels; and
aggregating the plurality of estimated perceptual sizes in order to obtain an overall estimated perceptual size of the audio object.

8. The method according to claim 7, wherein generating the plurality of estimated perceptual sizes from the ICCs comprises:
determining the plurality of estimated perceptual sizes based on a predefined correspondence between the ICCs and a plurality of perceptual sizes.

9. The method according to claim 7, wherein aggregating the plurality of estimated perceptual sizes comprises:
averaging the plurality of estimated perceptual sizes as the overall estimated perceptual size; or
selecting a maximum one of the plurality of estimated perceptual sizes as the overall estimated perceptual size.

10. The method according to claim 7, further comprising:
calibrating the estimated perceptual size by comparing a perceptual size of the audio object of the multi-channel format in playback with a perceptual size of the audio object with the generated metadata having an estimated perceptual size in playback.

11. The method according to claim 10, further comprising:
dividing a space constructed by a plurality of transducers to a plurality of sub-spaces for the calibration.

12. A system for processing audio content, the audio content including at least one audio object of a multi-channel format, the system comprising:
a metadata generating unit configured to generate metadata associated with the audio object, the metadata generating unit including at least one of:
a trajectory metadata generating unit configured to generate an estimated trajectory of the audio object; and
a size metadata generating unit configured to generate an estimated perceptual size of the audio object, the perceptual size being a perceived area of a phantom of the audio object produced by at least two transducers,
wherein the trajectory metadata generating unit comprises:
a candidate position generating unit configured to generate a candidate position group including at least one candidate position for each of a plurality of frames of the audio object;

a position selecting unit configured to select an estimated position from the generated candidate position group for each of the plurality of frames based on a global cost function for the plurality of frames; and a trajectory generating unit configured to generate a trajectory with the selected estimated positions across the plurality of frames as the estimated trajectory.

13. The system according to claim 12, wherein the candidate position generating unit comprises:

a correspondence defining unit configured to define a position correspondence between a plurality of panning vectors and a plurality of positions;

an energy calculating unit configured to calculate an energy value for each of a plurality of channels and a respective panning vector for each of the plurality of frames of the audio object, the panning vector being a group of ratios with each of the ratio equal to the energy value of one of the plurality of channels over a sum of the energy values of the plurality of channels;

a panning vector preserving unit configured to preserve a plurality of panning vectors, with differences between the preserved panning vectors and the calculated panning vector being within a predefined value; and a group generating unit configured to generate the candidate position group for each of the plurality of frames in accordance with the preserved panning vectors based on the position correspondence.

14. The system according to claim 13, wherein the candidate position generating unit further comprises:

a reference position calculating unit configured to calculate a reference position of the audio object for each of the plurality of frames based on the calculated panning vector and a predefined position for each of the plurality of channels; and a position removing unit configured to remove the candidate position from the candidate position group in response to a distance between a candidate position and the reference position being greater than a predefined threshold.

15. The system according to claim 14, wherein the group generating unit comprises:

a group testing unit configured to detect whether the candidate position group is empty or not; and a group refilling unit configured to either refill the predefined position for the frame into the candidate position group, or refill a position into the candidate position group, a distance between the refilled position and the reference position being below a predefined threshold.

16. The system according to claim 12, wherein the position selecting unit comprises:

an estimated position selecting unit configured to select the estimated position based on the smallest sum of distances between the candidate positions for each adjacent two of the plurality of frames.

17. The system according to claim 12, wherein the trajectory metadata generating unit further comprises:

a dimension converting unit configured to either convert the estimated position for each of the plurality of frames from a two-dimensional (2D) format to a three-dimensional (3D) format, based on at least one of a content type of the audio object and the estimated position for each of the plurality of frames, or convert the estimated position for each of the plurality of frames from a 3D format to a 2D format by removing information of one dimension from the estimated position.

18. The system according to claim 12, wherein the size metadata generating unit comprises:

an ICC calculating unit configured to calculate an inter-channel correlation coefficient (ICC) of each pair of a plurality of channels in time domain or frequency domain;

a size generating unit configured to generate a plurality of estimated perceptual sizes from the ICCs of pairs of the plurality of channels; and a size aggregating unit configured to aggregate the plurality of estimated perceptual sizes in order to obtain an overall estimated perceptual size of the audio object.

19. The system according to claim 18, wherein the size generating unit comprises:

an ICC converting unit configured to determine the plurality of estimated perceptual sizes based on a predefined correspondence between the ICCs and a plurality of perceptual sizes.

20. The system according to claim 18, wherein the size aggregating unit comprises:

an overall size estimating unit configured to either average the plurality of estimated perceptual sizes as the overall estimated perceptual size, or select the maximum one of the plurality of estimated perceptual sizes as the overall estimated perceptual size.

21. The system according to claim 18, wherein the size metadata generating unit further comprises:

a size calibration unit configured to calibrate the estimated perceptual size by comparing a perceptual size of the audio object of the multi-channel format in playback with a perceptual size of the audio object with the generated metadata having an estimated perceptual size in playback.

22. The system according to claim 21, wherein the size calibration unit comprises:

a space dividing unit configured to divide a space constructed by a plurality of transducers to a plurality of sub-spaces for the calibration.

23. A computer program product for processing audio objects in an audio content, the computer program product being tangibly stored on a non-transient computer-readable medium and comprising machine executable instructions which, when executed, cause the machine to perform steps of the method according to claim 1.

* * * * *